Oct. 23, 1962 G. F. ORESKEY 3,059,630
BAIT PROJECTING GUN
Filed Dec. 7, 1961 2 Sheets-Sheet 1

Fig II

INVENTOR.
George F. Oreskey
BY WHITEHEAD, VOGL, & LOWE
PER Frank C. Lowe
Attorneys Oct. 23, 1962  G. F. ORESKEY  3,059,630
BAIT PROJECTING GUN Filed Dec. 7, 1961  2 Sheets-Sheet 2

INVENTOR.
George F. Oreskey
BY WHITEHEAD, VOGL, & LOWE
PER Frank C. Lowe
Attorneys United States Patent Office 3,059,630
Patented Oct. 23, 1962

3,059,630
BAIT PROJECTING GUN
George F. Oreskey, 1549 Stone Ave., Pueblo, Colo.
Filed Dec. 7, 1961, Ser. No. 157,779
5 Claims. (Cl. 124—27)

This invention relates to casting devices for use with fishing equipment and especially for fishing tackle with spinning reels having monofilament lines. A primary object of the invention is to provide a novel and improved casting device for casting bait and lures as a supplement to conventional fishing tackle, which is independent of the fishing tackle itself, and which may be conveniently provided in a general form of a gun or pistol. As such, the invention will be hereinafter referred to as a casting gun.

Another object of the invention is to provide a novel and improved casting gun which is adapted to throw a lure or bait a substantial distance, farther and more accurately than is possible with regular fishing tackle and which includes improved means for arranging the cast of a line having one or more spaced lures or baits, without snapping the line and otherwise breaking the line or tearing a bait off the hook.

Another object of the invention is to provide a casting gun which is especially useful in cramped situations, as where overhanging foliage, or the like, will interfere with and will not permit casting with regular fishing tackle.

Another object of the invention is to provide a novel and improved casting gun which may be proportioned to throw comparatively heavy lures substantial distances, as in surf fishing, and thereby permit the use of smaller and less expensive fishing tackle for such particular sports.

Another object of the invention is to provide a novel and improved bait-casting gun which is versatile in its use and which may be used for casting bait lures and also may be used for shooting line-connected darts and the like, both in above-water and even in under-water activities.

Other objects of the invention are to provide a novel and improved bait-casting gun, which is a neat appearing, rugged, reliable low-cost unit, which is easy to set, easy to load and use, and which may, in one form, be easily adjusted for casting to selected distances.

With the foregoing and other objects in view, all of which more fully hereinafter appear, my invention comprises certain novel and improved constructions, combinations, and arrangements of parts and elements as hereinafter described, defined in the appended claims, and illustrated in the accompanying drawings in which:

FIG. 1 is a perspective, somewhat diagrammatic view of a fishing rod and reel, and my improved casting gun, illustrating the end of the fishing line as carrying a weight or lure which is set into the gun and a second lure or bait which is connected to the line above the weight, and with the line and second lure being positioned behind the gun, preliminary to a shooting or casting by the gun to prevent line snapping as the gun is fired.

FIG. 11 is an elevational view of a simple type of rod which is especially adapted to cock or set the gun.

The concept of using casting devices in connection with fishing tackle is old, but such devices were generally made and introduced at a time when fishing tackle did not have the degree of perfection presently available and especially when casting lines were wound upon rotating reels. When the inertia and resistance to suddenly rotating a reel and all of the line upon it is considered, it is immediately apparent that a casting gun or any similar device is fundamentally ineffectual to obtain an improved cast over that which is possible by casting with a rod. However, with the present development of spinning reels, using mono-filament lines of a type which have no significant resistance to sudden accelerated movements, such as the movement of a projectile from a gun, the basic considerations are changed. With such in mind, the present invention was conceived and developed, and comprises, in essence, an improved and simplified construction of a casting gun which is especially adapted for use with fishing tackle using a spinning reel.

Figure 1:
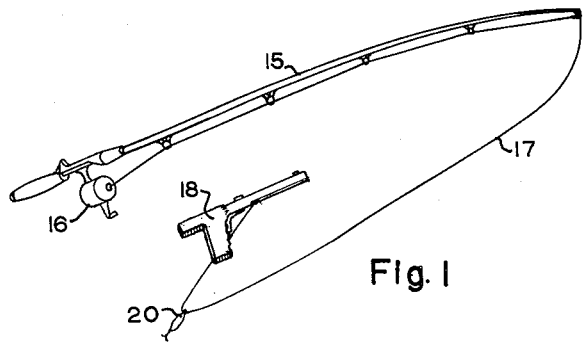
Figure 2:
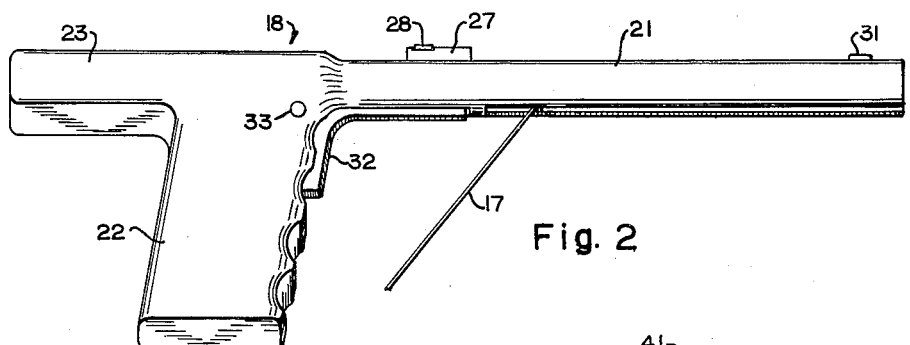
FIG. 2 is a perspective view of the gun as from a side thereof, and showing a portion of the underside of the gun to better illustrate the end of a fishing line as extending into a slot in the barrel in accordance with the principles of the invention.
Figure 4:
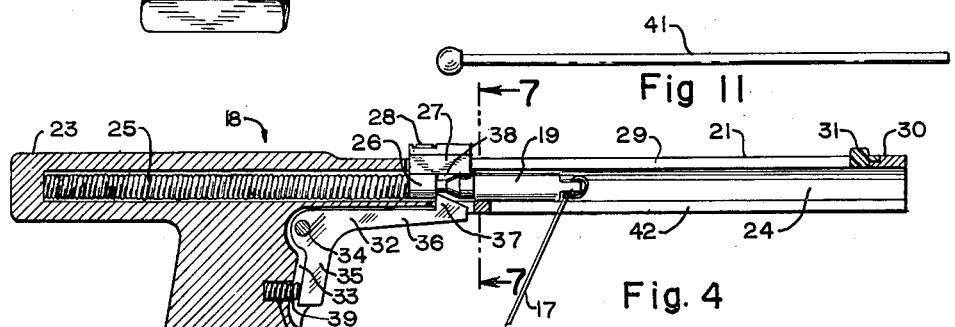
FIG. 4 is a longitudinal, sectional elevation as viewed from the indicated line 4—4 at FIG. 3.
Figure 3:
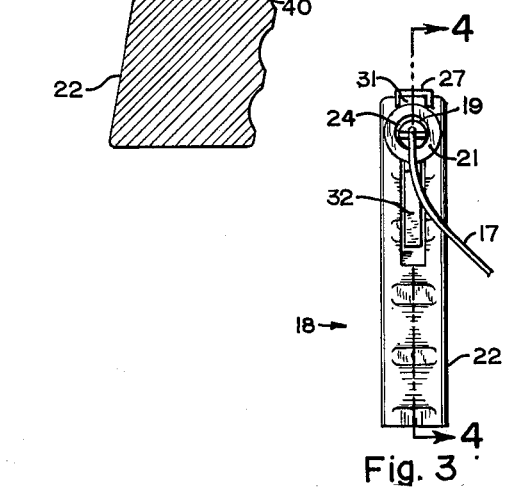
FIG. 3 is an end-elevational view as looking into the muzzle of the gun.
Figure 5:
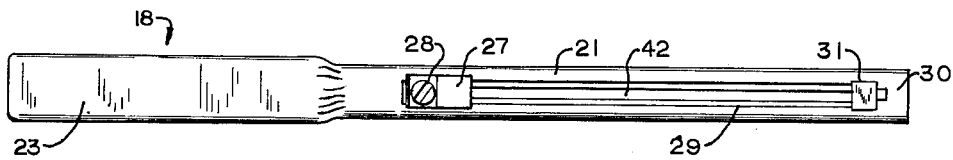
FIG. 5 is a plan view of the gun.
Figure 6:
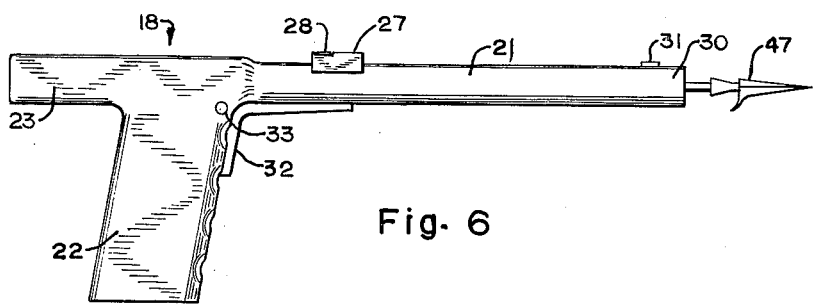
FIG. 6 is a side-elevational view of the gun on a slightly reduced scale and partially in section and illustrating a line-connected dart, mounted therein.

Referring more particularly to the drawing, FIG. 1 illustrates a typical rod 15 and a spinning reel 16 which carries a mono-filament line 17 of a type which is adapted to be used in connection with my invention, a casting gun 18. The gun as illustrated is conveniently shaped as a pistol. The line 17 is adapted to carry a sinker 19 or a similar weight within it as illustrated at FIG. 4, and when using such a sinker a lure 20 may be attached to the line above the weight. Preliminary to firing the gun, the lure will be positioned behind the sinker somewhat as illustrated at FIG. 1, as hereinafter further described.

The casting gun 18 is conveniently formed as a longitudinally extended, cylindrical barrel 21, with a laterally extended, slightly inclined gripping handle 22 below the base portion of the barrel. The barrel 21 fairs into a rearwardly extending butt 23, similar in appearance to the breach lock of a conventional pistol, and providing, with the barrel, a well-balanced, neat-appearing unit.

The barrel of the gun is formed with a cylindrical bore 24, which extends rearwardly into the butt to a depth approaching the length of the unit. The gun is thus a muzzle-loading unit and the bore 24 is sized to receive the selected sinker weight 19 or it may be sized to receive various lures when sinkers are not used.

The casting mechanism includes a stiff spring 25 which is carried within the bore and extends rearwardly therein and into the butt portion of the gun. The spring is compressed into the butt portion of the gun preliminary to a firing and held by a trigger release mechanism hereinafter described. The spring is adapted to drive a short cylindrical piston 26 which abuts against the forward end of the spring and is slideably carried within the barrel. The sinker weight 19 or like object is adapted to set against the forward face of the piston to be driven from the gun by movement of the piston when a casting operation occurs. The operational reach of this piston thus extends from a rearward position in the barrel and near the butt when the spring is fully compressed, as illustrated at FIG. 4, and to a position near the forward or muzzle end of the barrel at the end of its stroke when the spring is extended.

Figures 7, 8:
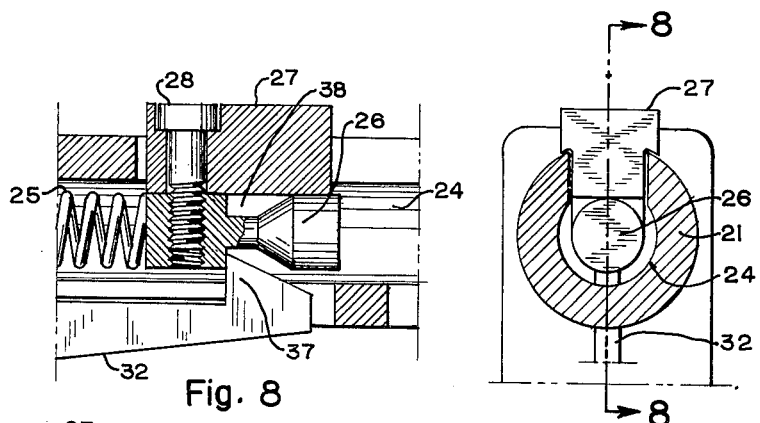
FIG. 7 is a fragmentary sectional detail, as taken substantially from the indicated line 7—7 at FIG. 4, but on an enlarged scale.
FIG. 8 is a fragmentary sectional detail as viewed substantially from the indicated line 8—8 at FIG. 7.

To hold the piston in position within the barrel 19, a flanged head 27 upstands from the piston 26 and is held thereto by a lock screw 28, as in the manner clearly illustrated at FIG. 8. This head 27 extends upwardly and through a longitudinally extended slot 29 along the top of the barrel. The reach of this slot 29 is accordingly from the retracted position of the piston 26 near the butt portion, and to an extended position near the muzzle of the gun, the slot being closed at its extended end by a continuous portion 30 of the cylindrical structure forming the barrel at the muzzle. A rubber or like resilient abutment 31 is mounted in the slot and against the portion 30 to receive and reduce the shock effect incurred when the piston 26 and head 27 are suddenly stopped in their forward movement as when the gun is fired by releasing the spring 25.

The gun is operated by a trigger 32 which is positioned at the forward side of the handle 22 in a recess 33 in the underside of the barrel and in the handle. The trigger is formed as a typical angle-shaped member carried on a pivot 34 within the recess 33, and one leg of the angle extends downwardly alongside the handle 22 to form the finger lever 35. The other leg extends underneath the barrel to function as a release lever 36. The release is effected by a hook 37 which upstands from the leg 36 and extends forwardly into the recess 33 to lie in a notch 38 in the piston when the piston is in the retracted position as illustrated at FIG. 4. To eliminate slack movement in the trigger and to normally hold the hook 37 in the notch 38, a spring 39 is mounted in a socket 40 in the handle to bear against the backside of the finger lever 35.

Preliminary to using the casting gun, it is first cocked in any suitable manner by pushing the piston 26 into the barrel until the spring is compressed and the trigger hook 37 snaps into the notch 38. The cocking may be accomplished externally of the gun by pushing against the head 27 or, preferably, it may be accomplished by psuhing a rod 41 into the barrel from the muzzle end, a suitable rod for this purpose being illustrated at FIG. 11.

It was found essential that the fishing line be positioned at least laterally and preferably in trailing relation to the projected casting movement of the sinker weight 19, as it is projected from the gun. This is necessary in order to prevent a pile up and fouling of the line as the sinker weight commences its sudden movement out of the barrel of the gun. More especially, it is important to prevent jerking of the line when a lure 20 is attached to the line above the weight. If the lure is in a position ahead of the movement of the sinker weight, as it is shot from the gun, the sudden tension on the line which will occur as the fast moving sinker takes up slack and commences to pull the lure could easily break the line. If the lure is a live bait, this taking up of slack could easily pull or jerk the bait off the hook. To arrange the line in such manner as to provide a small tension, or at the least to take up all slack of the line in the region immediately above the line, as where a lure 30 would be affixed to the line, a longitudinal slot 42 is formed at the under edge of the barrel throughout its length. This slot 42 is open at the muzzle end of the gun and the walls of the slot are preferably finished and smoothed, to permit a smooth, frictionally free movement of the line within the slot. With this arrangement, the portion of the line between the sinker and the lure may be aligned in such a manner as to permit the lure to commence movement the instant the sinker commences movement within the gun, and without any jerking action as the line commences to move.

Figure 9:
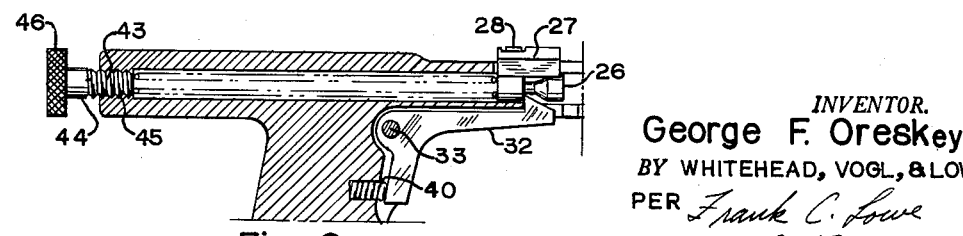
FIG. 9 is a fragmentary portion of a longitudinal, sectional elevation, similar to the showing at FIG. 4 but illustrating a modified construction incorporating a distance adjustment screw therein.

As a modification to the basic construction illustrated at FIGS. 1 through 8, an adjusting screw 43 as illustrated at FIG. 9 may be incorporated into the body of the gun to permit variation of the range or distance the gun is capable of throwing a sinker. This adjusting screw 43 is formed as a simple, threaded rod 44 which is turned into a threaded socket 45 at the breech end of the gun, so that the rearward end of the spring 25 abuts against the end of the rod 44. A knurled knob 46 is formed on the rearward end of this adjusting screw to facilitate finger turning thereof. It is immediately apparent that turning this screw outwardly in a rearward direction will release the pressure on the spring 25 somewhat when the gun is cocked and ready to fire and will reduce the effective range, while turning the adjusting screw forwardly and to its full depth in the breech, will tighten the spring when it is cocked and produce a maximum firing range.

Not only is it possible to cast baits and sinkers from the improved casting gun, it is possible to shoot other object, such as a line-connected dart 47. The dart will fit into the gun as in the manner illustrated at FIG. 6, and is preferably shot in the art but it also may be shot under water as in the sport of spearing fish.

Figure 10:
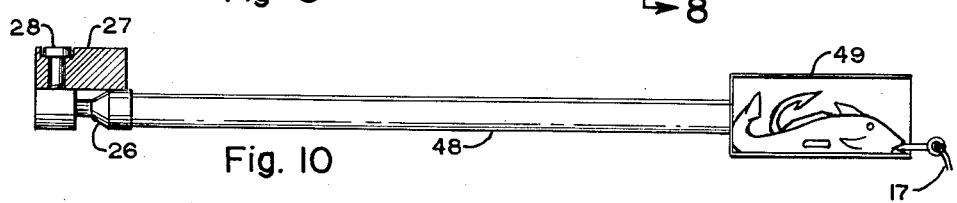
FIG. 10 is a fragmentary sectional view of a container-adaptor of a type which is adapted to be used in connection with the invention as in a modification thereto, and which may conveniently carry a soft bait to permit the bait to be cast a substantial distance therefrom without damaging or snapping the bait off the hook.

A further modification of the structure for bait casting is illustrated at FIG. 10. A rod 48, having a length comparable with that of the gun barrel, is formed with a bait-holding cup 49 at one end and a piston member 26' at the other end. This piston 26' is adapted to be installed in the gun as a substitute for the piston 26 hereinabove described. Installation is a simple matter, for it is merely necessary to remove the piston 26 by removing the screw 28 and then disconnecting the head 27 from the piston. The bait casting rod may then be inserted into the barrel of the gun and the head 27 connected onto the modified piston end 26 by tightly reinserting the screw 28.

While I have now described my invention in considerable detail and have also described certain modifications thereto, nevertheless, it is obvious that others skilled in the art can devise and build alternate and equivalent constructions which are fully within the spirit and scope of my invention. Hence I desire that my protection be limited, not by the constructions illustrated and described, but only by the proper scope of the appended claims.

I claim:

1. A casting gun for casting bait and lures carried on a fish line, formed generally as a pistol-shaped unit and comprising:

(a) A barrel carried upon a laterally outstanding gripping handle having a cylindrical bore therein which is closed at the rearward base end, and open at the forward muzzle end and with a forward reach extending forwardly of the handle, a first longitudinally extended slot in the forward reach of the barrel being closed at the muzzle end thereof and terminating at an abutment adjacent to the muzzle end thereof, and a second longitudinally extended slot in the forward reach of the barrel and being open at the muzzle end thereof;

(b) a spring within the bore abutting against the base end of the barrel and being adapted to drive forwardly towards the muzzle end of the barrel when released from a compressed position in the rear portion thereof, (c) a piston carried within the bore against the forward end of the spring having a laterally projecting head thereon adapted to extend into said first slot whereby to restrict the movements of the piston to the indent of the slot, and (d) a trigger release means mounted on the handle adapted to hold the spring and piston in a compressed, cocked position and to release the same by finger pressure, whereby to permit a lure set within the bore against the piston with the fish line threaded into the second said slot to be projected from the gun by trigger release action.

2. The casting gun defined in claim, 1 wherein the abutment at the forward end of said slot is formed as a resilient pad.

3. The casting gun defined in claim 1, wherein the laterally projecting head on the piston extends beyond the outside surface of the barrel to facilitate gripping and cocking of the gun.

4. The casting gun defined in claim 1, wherein the piston includes a rod adapted to extend forwardly out of the barrel and a bait-holding cup at the end of the rod.

5. The casting gun defined in claim 1, including a screw adjusting means at the base of the gun adapted to permit adjustments to the spring compression.

References Cited in the file of this patent

UNITED STATES PATENTS 2,348,040     Vieths _____ May 2, 1944